United States Patent Office.

EDWARD J. DE SMEDT, OF NEW YORK, N. Y., ASSIGNOR TO NEW YORK IMPROVED ANTHRACITE COMPANY, OF NEW YORK CITY.

Letters Patent No. 100,269, dated March 1, 1870.

IMPROVED COMPOSITION FOR ROOFING, PAVING, &c.

The Schedule referred to in these Letters Patent and making part of the same.

To all whom it may concern:

Be it known that I, EDWARD J. DE SMEDT, of the city, county, and State of New York, have invented a new and improved Composition for Roofing, Paving, and similar purposes; and I do hereby declare that the following is a full, clear, and exact description of the same.

This invention relates to a new and improved composition for roofing, paving, and similar purposes, and has for its object the rendering of the composition, which has coal-tar or coal-pitch, or their chemical equivalents, for its principal ingredients, sufficiently hard or of such a degree of consistency that it will resist ordinary degrees of heat, and remain fixed where it is laid or spread for use under the action of the rays of the sun.

The great objection to compositions of this kind hitherto has been that they will, especially when laid or spread upon roofs having a material degree of inclination, soften under the heat of the sun and run or become displaced by virtue of their own gravity, and when such compositions are used for paving purposes, become so soft as to be readily indented, tracked up, and rendered worthless by persons walking over them.

To remedy this difficulty I add to the coal-tar or coal-pitch, a substance known as Ritchie mineral, Grahamite and solidified petroleum, which is found in Ritchie county, West Virginia, and also add what is termed Albertite, a substance found in New Brunswick, Canada.

The Ritchie mineral and Albertite are reduced to a fine powder by any suitable mechanical means, and the powder mixed with the coal-tar or coal-pitch, which is heated, and the whole mass stirred until the Ritchie mineral and Albertite are entirely dissolved, the coal-tar or coal-pitch being first melted at a low temperature, and the Ritchie mineral and albertite then added while the whole mass is being stirred and the temperature increased to about 250° Fahrenheit, the stirring being continued until the Ritchie mineral and Albertite are entirely melted and a thorough incorporation of all the substances effected.

The Ritchie mineral is quite similar in character to the Albertite, and either of these substances may be used separately, but I prefer to use them combined, as specified, and in the following proportions to wit: from twenty to sixty per cent. of the Ritchie mineral or Albertite, and from eighty to forty per cent. of the coal-tar or coal-pitch.

Having thus described my invention,

What I claim as new, and desire to secure by Letters Patent, is—

Coal-tar or coal-pitch, or their chemical equivalents, combined with the substances termed and known as the Ritchie mineral and Albertite, either or both, substantially as and for the purpose herein set forth.

The above specification of my invention signed by me this 8th day of January, 1870.

E. J. DE SMEDT.

Witnesses:
 THEO. TUSCH,
 CHARLEY SCHENK.